United States Patent [19]

Yu

[11] Patent Number: 5,761,021

[45] Date of Patent: Jun. 2, 1998

[54] VOLTAGE SURGE SUPPRESSION DEVICE

[76] Inventor: Jeff Yu, 2491 Ramke Pl., Santa Clara, Calif. 95050

[21] Appl. No.: 699,893

[22] Filed: Aug. 16, 1996

[51] Int. Cl.$^6$ ............................................. H02H 3/22
[52] U.S. Cl. ........................ 361/111; 361/56; 361/104; 361/118; 340/635
[58] Field of Search .................... 361/56, 111, 91, 361/103, 104, 106, 118, 117, 124–126; 174/53; D13/138, 160; 439/660, 692–693; 340/635, 638, 656, 660

[56] References Cited

U.S. PATENT DOCUMENTS

| D. 243,244 | 2/1977 | Creamer | D13/138 |
|---|---|---|---|
| 3,983,407 | 9/1976 | Shott | 307/146 |
| 4,089,032 | 5/1978 | Dell Orfano | 361/56 |
| 4,628,394 | 12/1986 | Crosby et al. | 361/56 |
| 4,760,485 | 7/1988 | Ari et al. | 361/54 |
| 4,903,162 | 2/1990 | Kopelman | 361/103 |
| 4,907,118 | 3/1990 | Hames | 361/56 |

*Primary Examiner*—Fritz Fleming
*Assistant Examiner*—Michael J. Sherry
*Attorney, Agent, or Firm*—Richard Liu

[57] ABSTRACT

A voltage surge suppression device is disclosed requiring no modification to electrical outlets for its installation. The device includes prongs for mating with a receptacle of a given electrical outlet, such as a wall outlet or a power strip. The device places its voltage surge suppression elements inside a cube-like housing sufficiently modular for easy removal and replacement and sufficiently small in size whereby allowing plugs of electrical appliances to be mated with the receptacles immediately adjacent to where the voltage surge suppression device is connected. When the need arises to replace the device, the replacement cost does not include the costs for circuit elements such as receptacle contacts, additional prongs, and an entire power strip.

10 Claims, 2 Drawing Sheets

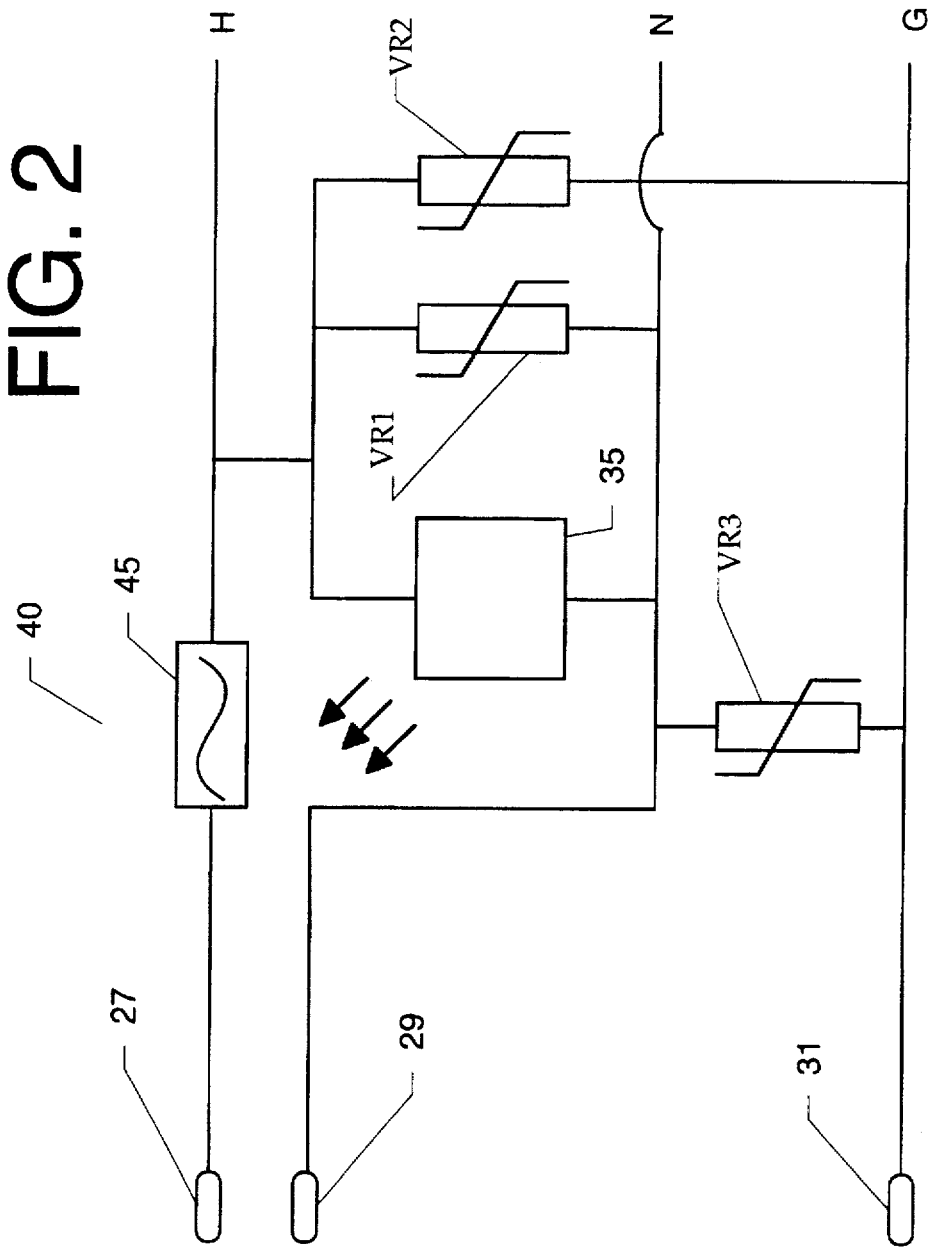

5,761,021

1

VOLTAGE SURGE SUPPRESSION DEVICE

FIELD OF THE INVENTION

This invention relates generally to the protection of electrical equipment from damage caused by excessive voltage surges, and more particularly, the present invention is an electrical surge suppression device removably mounted to any of various types of electrical outlets, including standard electrical wall outlets.

BACKGROUND INFORMATION

It is well known that a variety of electrical surge suppression devices have long been used for the protection of electrical equipment from the electrical spikes that occur from time to time in power lines. Each surge suppresser typically serves one electrical device which is deemed to be particularly important to protect, usually because of its expense or the severe problems that can result from the equipment being taken out of service.

One implementation of conventional surge suppression device is embodied in a triangular shaped housing. A threaded structure protrudes from the triangular housing; and this threaded structure is used to mount the surge suppression device. The type of structure to which this surge suppression device can be mounted must also be threaded. Accordingly, substantial modification of an electrical outlet is also required in order to mount that surge suppression device to the electrical outlet making it not readily removable.

Another implementation discloses a surge suppression device being embodied inside a power strip whereby protecting the receptacles of that power strip. Accordingly, this suppression device is similarly not readily removable and furthermore, once the surge suppression device is triggered and used, the replacement cost for the device would uneconomically include the cost of another power strip.

Yet another implementation discloses a surge suppression device being "sandwiched" by the front side portion of an electrical outlet (e.g., a wall outlet, a power strip) and an appliance being protected. More specifically, electrical appliances for which surge suppression is to be provided are plugged into the female contacts of a set of receptacles provided on the back side portion of the surge suppression device. Prongs on the front side portion of the surge suppression device are then plugged into the front of an electrical outlet to electrically connect the electrical appliances to the electrical outlet. The surge suppression elements of the device protect the electrical appliances from transient voltage surges in the voltage available at the electrical outlets. Accordingly, the receptacles and the prongs of the surge suppression device have added to the cost of device replacement. Furthermore, the size of the device after having to incorporate the additional receptacle and prong apparatus does not provide sufficient room for other electrical appliances to be plugged into the receptacles the electrical outlet immediately adjacent to where the device is connected.

A need therefore exists for providing a surge suppression device which is readily removable from the front of an electrical outlet, yet which require no modification of the electrical outlet. Such a device should also be easily replaced with as low a cost as possible.

SUMMARY OF THE PRESENT INVENTION

Accordingly, It would be desirable and therefore an object for the present invention to provide a surge suppression

2 device which is readily removable from the receptacle side of an electrical outlet. It is also an object for the present invention to require no modification of the electrical outlet for surge suppression device attachment. It is another object for the present invention to be easily replace-able with as low a cost as possible. It is yet another object for the present invention to minimize the size of the surge suppression device so as to provide protection for and to allow as many electrical devices connected to a given wall outlet as possible.

Additional objects and advantages of the present invention will be set forth in the description which follows, and in part, will be obvious from the description or may be learned by practice of the invention. To achieve the foregoing objects, and in accordance with the purpose of the invention as embodied and broadly described herein, there is provided a device for suppressing transient surges in electrical power available from an electrical outlet having power circuit connection terminals including "Hot", "Neutral" and "Ground" terminals configured into a multiple of receptacles one electronically connected to the other in a serial manner and each being ready for receiving plug prongs of an electrical appliance, said surge suppression device includes a cube-like housing having a top surface and a bottom surface disposed opposite thereto and being sufficiently small in size for allowing plug prongs of other appliances to be received by immediately adjacent receptacles of the electrical outlet, a set of plug prongs protruding from the bottom side of the cube-like housing adapted to be received by a receptacle of the electrical outlet whereby making electrical contacts with the connection terminals, and surge suppression elements disposed inside the housing providing surge protection for all of the electrical devices connected to the given electrical outlet for all of the connection terminals.

The present invention requires no modification to the electrical outlet and its use can be accomplished very quickly and does not interfere with the mechanical or electrical integrity of the connection terminals. Furthermore, the invention eliminates the extraneous parts (e.g., a "sandwiching" receptacle, a power strip apparatus) and eliminates extra lead lengths, thereby improving the suppression performance and avoiding the need for space outside of the mated plug and receptacle to perform its function. It is easy to replace, in-expensive to manufacture and its reduced size now truly allows plug prongs of other electrical appliances to be received by immediately adjacent receptacles of the electrical outlet.

BRIEF DESCRIPTION OF THE DRAWINGS

The accompanying drawings, which are incorporated in and form a part of this specification, illustrate a preferred embodiment of the invention and, together with the description, serve to explain the principles of the invention:

FIG. 2 is a circuit diagram illustrating the surge suppression elements of a preferred embodiment of the present invention.

DESCRIPTION OF EMBODIMENTS

Figure 1:
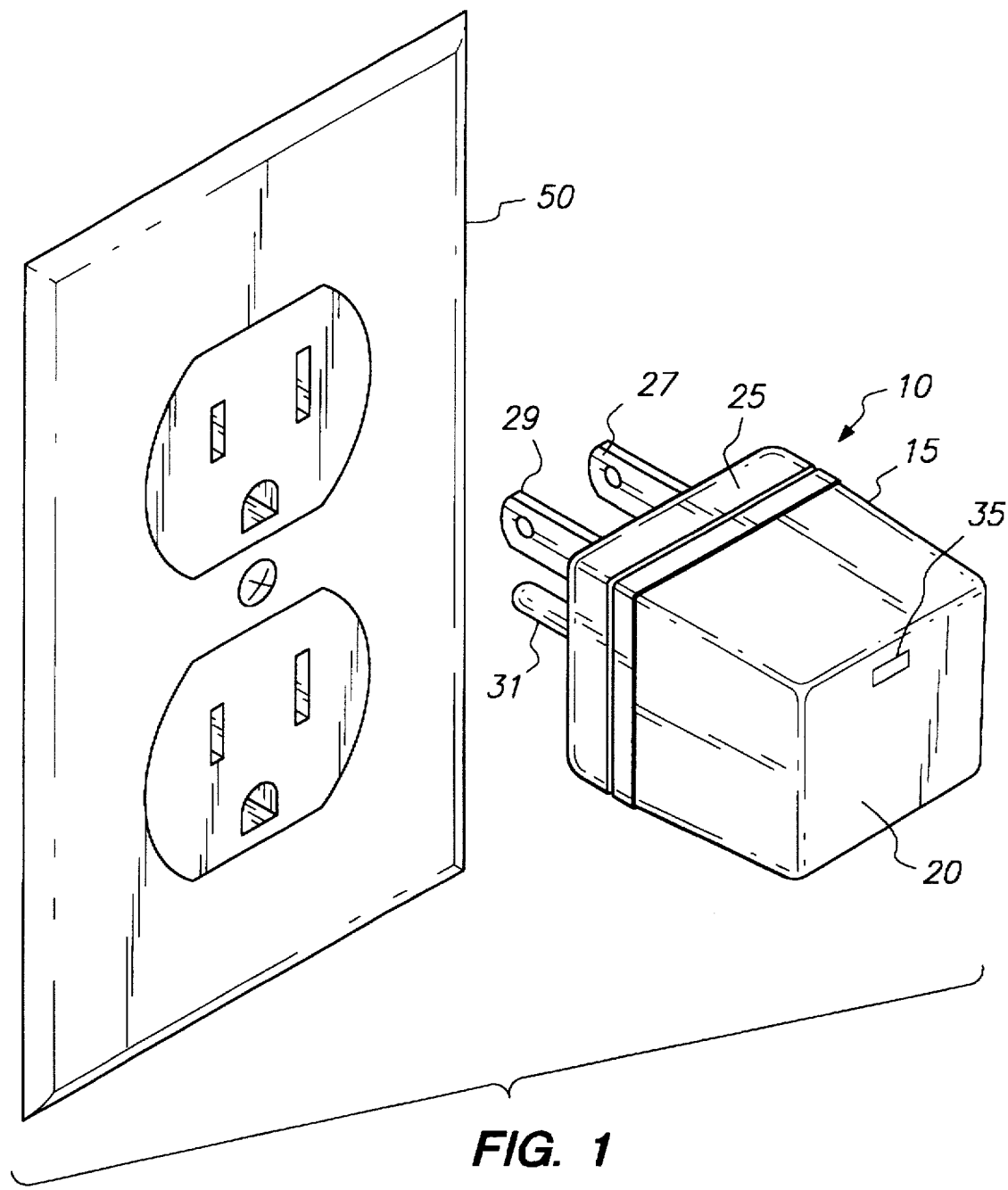
FIG. 1 illustrates how a preferred embodiment of the present invention is used with a given electrical outlet.

The preferred embodiments of a voltage surge suppression device according to the present invention will now be explained with reference to FIGS. 1 and 2.

Referring to FIG. 1, a preferred embodiment of the present invention is described. FIG. 1 shows the outside appearance of a device 10 (but not any electrical connections) for suppressing transient surges in electrical power available from an electrical outlet 50. The electrical outlet may be a standard electrical wall outlet of a type generally available for use in providing power to electrical appliances or to other devices needing electrical power to operate. Another example of the electrical outlet may be a portable power strip having a cord, a plug and multiple receptacles for allowing more electrical devices to draw power when its plug is mated with a wall mounted electrical outlet receptacle. The device 10 has a cube-like housing 15 which is enclosed and made preferably out of plastics and/or translucent materials. The cube-like housing 15 has a top surface 20 and a bottom surface 25 opposing each other. Three prongs, namely, Hot prong 27, Neutral prong 29, and Ground prong 31, protrude generally perpendicularly from the bottom surface 25. These prongs 27, 29, 31 are typical plug prongs adapted for mating with a receptacle of the electrical outlet.

The physical dimensions of the housing 15 may not be an exact cube but the lengths of the sides of the top and bottom surfaces 20, 25 which in operation are disposed generally parallel to the front surface of the electrical outlet have been found to be preferably not exceeding 1⅛ inch. It is also preferable to have the Hot prong 27 and the Neutral prong to be approximately ¼ inch away from the their nearest two sides of the bottom surface 25. Such a physical dimension configuration allows other plug prongs to be inserted into receptacles of the electrical outlet immediately adjacent to where the device 10 is plugged. Furthermore, such a physical configuration provides the most comfort for user fingers when attaching or removing the device 10 to and from a receptacle. For ergonomic reasons, it is also preferred that four edge sides 37 of the housing 15 which connect the bottom surface 25 and the top surface 20 of the housing 15 be inclined inward slightly so as to result in a bottom surface 25 somewhat larger than the top surface 20.

An indicator light 35 is disposed on and flush with the top surface 20 of the housing 15. The circuitry details for this indicator light 35 will be explained herein below. In operation, the indicator light 35 will be lit when the line voltage is typical and normal, for example, 120 V AC. This indicator light 35 being ON not only indicate to users that the current line voltage is normal; it further indicates that the voltage surge suppression device 10 itself is functioning properly. However, the indicator light 35 will go OFF after the device 10 had actually suppressed a voltage surge coming from the line voltage whereby indicating to the users the need to replace the device 10.

FIG. 2 is a circuit diagram illustrating surge suppression elements 40 of a preferred embodiment of the device 10. The surge suppression elements 40 are located inside the cube-like housing 15 wherein a H line leads to the hot prong 27, a N line leads to the neutral prong 29 and a G line leads to the ground prong 31. A varistor $VR_1$ and a LED circuit 35 connect the H line to the N line; a varistor $VR_2$ connects the H line to the G line and a varistor $VR_3$ connects the N line to the G line. There is a fuse-like element 45 which is disposed in series with the H line between the hot prong and $VR_1$. One aspect of the invention may include a capacitor element (not shown) disposed in electrical parallel with the $VR_1$ between the H line and the N line for EMI and/or RFI removal. The suitable values for this capacitor can be easily obtained without undue experimentation.

The varistors are preferred be metal oxide varistor and they are nonconductive or that they generate open circuits when normal voltages are applied to the electrical outlet. However, when voltage surges occur at levels above normal voltage levels, the varistors become immediately conductive and establish short circuits which divert the voltage surges away from the electrical appliances or devices plugged into the electrical outlet at the time. In other words, during normal voltages, $VR_1$, $VR_2$ and $VR_3$ of the surge suppression elements 40 create open circuits and in that case, all varistor connections are open circuits and only the H line is connected to the N line by the LED circuit 42 whereby on the one hand providing light emission and on the other hand allowing power to be transferred to the electrical appliances connected to the electrical outlet. Each varistor protects a line connection, for example, $VR_1$ protects the H-N line connection, $VR_2$ protects the H-G connection and $VR_3$ protects the N-G line connection. During sudden voltage surges, one or more varistors, $VR_1$, $VR_2$ and/or $VR_3$ may immediately be short circuited thereby shunting all of the surge power away from the electrical appliances plugged in at the time.

In the case where the varistors may not respond properly especially when voltage surges climb gradually and steadily, the fuse-like element 45 which normally acts as a short circuit will in that case responds by burning the line into an open circuit whereby causing the LED circuit 35 to go OFF and indicating to users that attention is needed for appliance inspection. The fuse-like element 45 may be disposed in series on any of the three lines (H, N, or G line) and in terms of construction, the element 45 may be a fuse, a meltable conductor or a fuse-like resistor.

The foregoing descriptions of preferred embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A voltage surge suppression device for protecting an electrical appliance from damage, the electrical appliance being supplied with power from an electrical outlet via a plug having a plurality of male prongs which mate with electrical contacts of an appliance receptacle disposed in the electrical outlet, said voltage surge suppression device comprising:

a cube-like housing being enclosed and having no open receptacle on its surfaces:

three prongs protruding generally perpendicularly from the bottom surface of the cube-like housing and being configured to mate with Hot, Neutral and Ground connection terminals in a receptacle of the electrical outlet and said receptacle being disposed immediately adjacent to said appliance receptacle;

each of the three prongs being connected to the other two prongs by at least one varistor;

one of the three prongs being adapted to mate with the Hot connection terminal of the receptacle, said prong being connected to a fuse-like element in an electronically serial manner; and said varistors and said fuse-like element being disposed inside the cube-like housing.

2. The voltage surge suppression device of claim 1 further includes an indicator light disposed inside the cube-like housing and flush with the top surface of the cube-like housing and being adapted to give off light during normal voltage power flow but to stop giving off light after a voltage surge had occurred.

3. The voltage surge suppression device of claim 1 wherein the cube-like housing is made out of plastics.

4. The voltage surge suppression device of claim 1 wherein the electrical outlet is a wall mounted outlet.

5. The voltage surge suppression device of claim 1 wherein the top surface of the cube-like housing is slightly smaller in size than that of the bottom surface.

6. The voltage surge suppression device of claim 2 wherein the indicator light is connected in electrical parallel with the varistor in the surge suppression device connecting the Hot and Neutral connection terminals in the receptacle of the electrical outlet.

7. The voltage surge suppression device of claim 1 wherein one the three prongs being adapted to mate with the Hot connection terminal of the receptacle intersects the bottom surface at a point approximately ¼ inch away from the nearest two sides of the bottom surface.

8. The voltage surge suppression device of claim 7 wherein one the three prongs being adapted to mate with the Neutral connection terminal of the receptacle intersects the bottom surface at a point approximately ¼ inch away from the nearest two sides of the bottom surface.

9. The voltage surge suppression device of claim 1 wherein said cube-like housing having a top and a bottom surface and said surfaces having sides no more than 1⅛ inch in length.

10. A voltage surge suppression device for protecting an electrical appliance from damage, the electrical appliance being supplied with power from an electrical outlet via a plug having a plurality of male prongs which mate with electrical contacts of an appliance receptacle disposed in the electrical outlet, said voltage surge suppression device comprising:

a cube-like housing being enclosed and having no open receptacle on its surfaces, and said housing having a top and a bottom surface wherein each side of the surfaces measure no more than 1⅛ inch in length;

an indicator light disposed inside the cube-like housing and flush with the top surface of the cube-like housing and being adapted to give off light during normal voltage power flow but to stop giving off light after a voltage surge had occurred;

three prongs protruding generally perpendicularly from the bottom surface of the cube-like housing and being configured to mate with Hot, Neutral and Ground connection terminals in a receptacle of the electrical outlet and said receptacle being disposed immediately adjacent to said appliance receptacle;

each of the three prongs being connected to the other two prongs by at least one varistor;

one of the three prongs being adapted to mate with the Hot connection terminal of the receptacle, said prong being connected to a fuse-like element in an electronically serial manner; and said varistors and said fuse-like element being disposed inside the cube-like housing.

\* \* \* \* \*